(12) United States Patent
Mathai et al.

(10) Patent No.: US 9,803,801 B2
(45) Date of Patent: Oct. 31, 2017

(54) COOLED MINIMUM QUANTITY LUBRICATION FOR MACHINING

(71) Applicant: Caterpillar Inc., Peoria, IL (US)

(72) Inventors: George Mathai, Peoria, IL (US); Rohit Bhapkar, Peoria, IL (US); Timothy Thorson, Morton, IL (US)

(73) Assignee: Caterpillar Inc., Peoria, IL (US)

( * ) Notice: Subject to any disclaimer, the term of this patent is extended or adjusted under 35 U.S.C. 154(b) by 271 days.

(21) Appl. No.: 14/819,144

(22) Filed: Aug. 5, 2015

(65) Prior Publication Data

US 2017/0038002 A1 Feb. 9, 2017

(51) Int. Cl.
*F16N 7/38* (2006.01)
*F16N 25/04* (2006.01)
*F16N 19/00* (2006.01)
*F16N 39/02* (2006.01)
*B23Q 11/00* (2006.01)

(52) U.S. Cl.
CPC ............ *F16N 7/38* (2013.01); *B23Q 11/0046* (2013.01); *F16N 19/00* (2013.01); *F16N 25/04* (2013.01); *F16N 39/02* (2013.01); *B23Q 2220/002* (2013.01)

(58) Field of Classification Search
CPC . F16N 7/38; F16N 19/00; F16N 25/04; F16N 39/02; B23Q 11/0046; B23Q 2220/002
See application file for complete search history.

(56) References Cited

U.S. PATENT DOCUMENTS

| 3,104,826 | A | * | 9/1963 | Morris | B05B 7/0433 239/413 |
| 3,106,346 | A | | 10/1963 | Thomas | |
| 3,515,676 | A | | 6/1970 | Hierta et al. | |
| 3,605,551 | A | * | 9/1971 | Steward | B23P 25/00 184/6 |
| 3,726,363 | A | * | 4/1973 | Sussman | B23Q 11/103 184/39.1 |

(Continued)

FOREIGN PATENT DOCUMENTS

| EP | 2755796 A1 | 7/2014 |
| GB | 2476900 A | 7/2011 |
| GB | 2501511 A | 10/2013 |

OTHER PUBLICATIONS

Cold Gun Aircoolant Systems.
Eliizabeth Engler Modic; Cryogenic Machining; Todays. Medical Developments/Nov. 2014.

*Primary Examiner* — Michael Riegelman
(74) *Attorney, Agent, or Firm* — Miller, Matthias & Hull LLP

(57) ABSTRACT

A system for dispensing lubricant in a stream of cool air to a work piece and a machine tool. A source of lubricant and cool air are coupled to a stationary coupler. A rotating turret includes a plurality of machine tools mounted thereon and the plurality of rotating couplers mounted thereon. Each machine tool is associated with or coupled to one of the rotating couplers. The turret rotates so that a rotating coupler is in abutting engagement with the stationary coupler. Lubricant and cool air pass through the stationary coupler to the rotating coupler, which delivers the lubricant and cool air to a nozzle that is directed at the machine tool associated with the rotating coupler.

20 Claims, 4 Drawing Sheets

(56) References Cited

U.S. PATENT DOCUMENTS

| | | | |
|---|---|---|---|
| 4,919,232 A | | 4/1990 | Lofton |
| 4,947,963 A | * | 8/1990 | Aho, Jr. .................. F01D 25/18 184/6 |
| 5,265,505 A | * | 11/1993 | Frechette ............. B23Q 1/0018 29/39 |
| 5,535,496 A | | 7/1996 | Sugino et al. |
| 6,036,412 A | * | 3/2000 | Dalla ................. B23Q 11/0046 408/56 |
| 6,287,058 B1 | * | 9/2001 | Arai ................... B23Q 11/0046 408/56 |
| 6,789,299 B1 | | 9/2004 | Kidder |
| 8,048,830 B1 | | 11/2011 | Jackson |
| 8,240,235 B2 | * | 8/2012 | Suda ...................... B23Q 11/10 451/7 |
| 8,876,447 B2 | | 11/2014 | Allehaux et al. |
| 9,144,872 B2 | * | 9/2015 | Meidar ............. B23Q 11/1053 |
| 2006/0049000 A1 | | 3/2006 | Boelkins et al. |
| 2006/0049280 A1 | | 3/2006 | Boelkins et al. |
| 2014/0027531 A1 | | 1/2014 | Rapchak |
| 2014/0196273 A1 | | 7/2014 | Balaji et al. |
| 2014/0353406 A1 | | 12/2014 | Kapoor et al. |
| 2015/0037110 A1 | | 2/2015 | Wunderlich et al. |

* cited by examiner

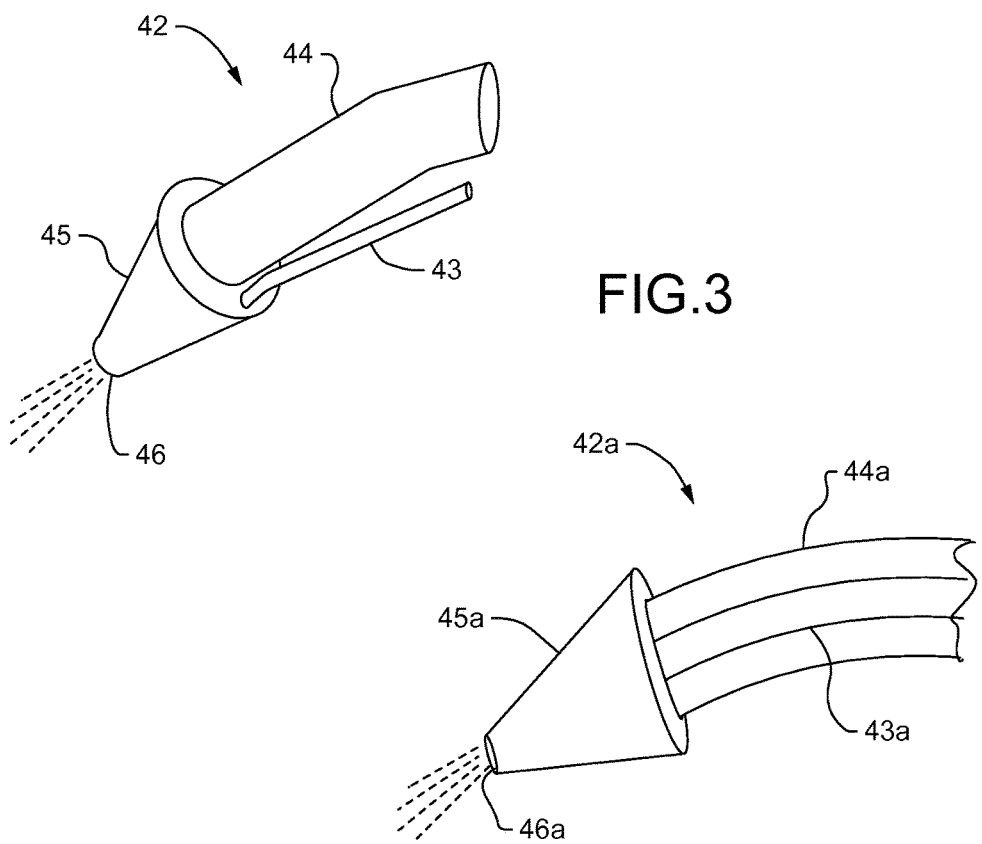
FIG.3
FIG.4
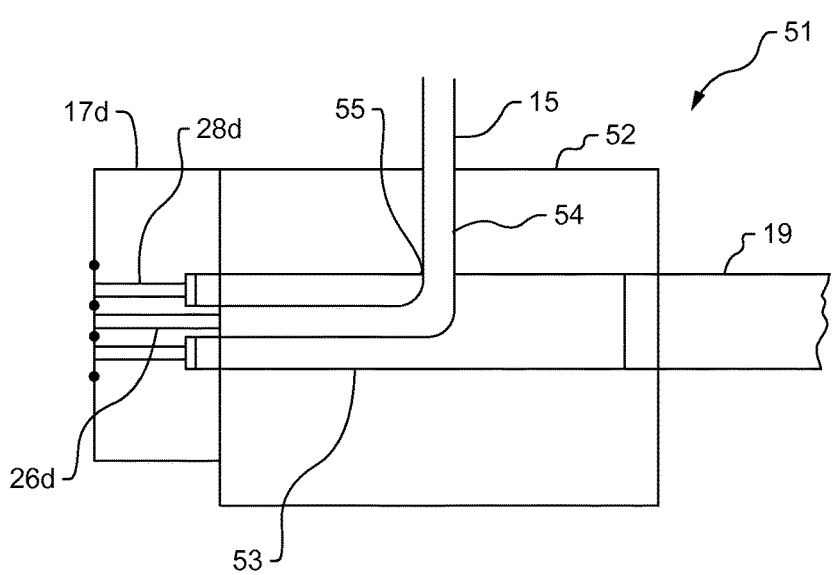
FIG.5

COOLED MINIMUM QUANTITY LUBRICATION FOR MACHINING

BACKGROUND

Technical Field

This document discloses a lubrication and cooling system for a machine tool that delivers lubricant entrained in cooled air to the machine tool and/or a work piece.

Description of the Related Art

Industrial operations routinely involve cutting and/or machining of hard materials, such as metals. Such operations often require the application of liquid lubricant and coolant to the machine tool and/or the work piece. Coolants dissipate heat generated by friction between the tool and the work piece, and generally include significant amounts of water. Lubricants, on the other hand, lubricate moving parts of the machine tool, and are normally petroleum-based. Often, a lubricant provides a cooling function and, conversely, a coolant provides a lubrication function. Thus, the terms "coolant" and "lubricant" may interchangeably refer to a "cutting fluid" applied to a work piece that is being machined or cut by a machine tool.

Cutting fluid may be delivered as a continuous stream, which is known as a flood application. Flood application of cutting fluid consumes large quantities of cutting fluid. One consequence of flood application is the need to recover used cutting fluid, filter any scrap particles from the used cutting fluid, and otherwise store and/or recycle the cutting fluid. If the cutting fluid includes a petroleum-based lubricant, any lubricant-coated scrap particles removed from the cutting fluid should be disposed of as hazardous waste. Further, the cutting fluid may itself contain hazardous waste, thereby requiring special handling procedures. A machine shop that employs flood application of cutting fluid may need to store large amounts of cutting fluid on the shop floor, thereby consuming valuable floor space. Further, a machine shop that collects used cutting fluid for recycling and/or for disposal must provide containers for storing the recyclable cutting fluid and/or the disposable cutting fluid, which may also consume valuable floor space. Additionally, if the scrap particles can be recycled, specialized or costly equipment may be required to remove cutting fluid from the metal particles, before the metal particles are fit for recycling.

To avoid the cost and waste associated with flood application of cutting fluid, manufacturers may deliver cutting fluid in the form of small amounts of lubricant entrained in a flow of compressed air, or "shop air," which provides a cooling function. This technique may include the use of a minimum quantity lubricant (MQL) system that delivers a mist or a atomized form of lubricant in a stream of shop air through a nozzle directed at the work piece. Other MQL systems may deliver a pulsed flow of lubricant in a stream of air. The lubricant may be light, non-petroleum oil delivered under pressure and combined with air in the nozzle before the combined stream is sprayed at the work piece and/or tool. Such systems are also referred to as "near dry" lubricant systems and are frequently used with computer numerical controlled (CNC) machine tools. As an improvement over flood application of cutting fluid, near dry lubricant systems greatly reduce the amount of lubricant used.

However, while near dry lubricant systems are excellent at providing lubrication, they are less effective at providing cooling to the machine tool and/or work piece because the shop air is delivered at the ambient temperature. Due to reduced cooling, use of near dry lubricant systems may result in thermal build-up that results in increased tool-wear, thermal distortion of work pieces and other less than desirable effects. To address this problem, US 2014/0027531 discloses the use of a vortex chamber to cool the shop air before it is directed at the work piece. However, the apparatus disclosed in US 2014/0027531 cannot be easily applied to complex machining operations where a plurality of different machine tools are mounted on a rotating turret because each machine tool typically includes its own nozzle for a more precise application of the lubricant/air flow to the work piece and machine tool.

Accordingly, there is a need for a system that supplies lubricant and cool air to a work piece that is being machined by multiple tools mounted on a rotating turret.

SUMMARY OF THE DISCLOSURE

In one aspect, this document discloses a system for dispensing lubricant in a stream of cool air to a work piece and a machine tool. The disclosed system may include a lubricant reservoir fluidly coupled to a lubricant pump. The lubricant pump may be fluidly coupled to a stationary lubricant inlet of a stationary coupler. The stationary lubricant inlet may be fluidly coupled to a stationary lubricant passage that extends through the stationary coupler to a stationary lubricant outlet. The disclosed system may further include a compressed air source fluidly coupled to a compressed air inlet of a vortex tube. The vortex tube may include a cool air outlet and a hot air outlet. The cool air outlet of the vortex tube may be fluidly coupled to a stationary cool air inlet of the stationary coupler. The stationary cool air inlet may be fluidly coupled to a stationary cool air passage that extends through the stationary coupler to the stationary cool air outlet. The disclosed system may further include a rotating coupler connected to a turret. The rotating coupler may include a rotating lubricant inlet and a rotating cool air inlet. The rotating lubricant inlet may be fluidly coupled to a rotating lubricant passage that extends through the rotating coupler to a rotating lubricant outlet. The rotating cool air inlet may be fluidly coupled to a rotating cool air passage that extends through the rotating coupler to a rotating cool air outlet. The turret and rotating coupler may be rotated to a position where the rotating lubricant inlet is in matching registry with the stationary lubricant outlet with a lubricant seal sandwiched therebetween, and where the rotating cool air inlet is in matching registry with the stationary cool air outlet with a cool air seal sandwiched therebetween. The rotating lubricant outlet and rotating cool air outlet may be fluidly coupled to a nozzle that is directed at the work piece and the machine tool.

In another aspect, this document discloses a machine tool assembly, which may include a minimum quantity lubricant (MQL) pump with a lubricant output and a compressed air output. The lubricant output may be fluidly coupled to a stationary lubricant inlet of a stationary coupler. The stationary lubricant inlet may be fluidly coupled to a stationary lubricant passage that extends through the stationary coupler to a stationary lubricant outlet. The compressed air output may be fluidly coupled to a compressed air inlet of a vortex tube. The vortex tube may include a cool air outlet and a hot air outlet. The cool air outlet of the vortex tube may be fluidly coupled to a stationary cool air inlet of the stationary coupler. The stationary cool air inlet may be fluidly coupled to a stationary cool air passage that extends through the stationary coupler to a stationary cool air outlet. The disclosed machine tool assembly may further include a rotating coupler connected to a turret. The rotating coupler may include a rotating lubricant inlet and a rotating cool air inlet. The rotating lubricant inlet may be fluidly coupled to a rotating lubricant passage that extends through the rotating coupler to a rotating lubricant outlet. The rotating cool air inlet may be fluidly coupled to a rotating cool air passage that extends through the rotating coupler to a rotating cool air outlet. The turret and the rotating coupler may be moveable to a position where the rotating lubricant inlet is in matching registry with the stationary lubricant outlet and with a lubricant seal sandwiched therebetween, and where the rotating cool air inlet is in matching registry with the stationary cool air outlet with a cool air seal sandwiched therebetween. The turret may be connected to a machine tool and a work piece. The rotating lubricant outlet and the rotating cool air outlet may be fluidly coupled to a nozzle that is directed at the work piece and the machine tool.

In another aspect, this document discloses a method for delivering lubricant entrained in a flow of cool air to a work piece and a machine tool. The method may include fluidly coupling an output from a lubricant pump to a stationary lubricant inlet of a stationary coupler. The stationary lubricant inlet may be fluidly coupled to a stationary lubricant passage that extends through the stationary coupler to a stationary lubricant outlet. The method may further include fluidly coupling a source of compressed air to a compressed air inlet of a vortex tube. The vortex tube may include a cool air outlet and a hot air outlet. The method may also include fluidly coupling the cool air outlet of the vortex tube to a stationary cool air inlet of the stationary coupler. The stationary cool air inlet may be fluidly coupled to a stationary cool air passage that extends through the stationary coupler to a stationary cool air outlet. The method may further include providing a rotating coupler connected to a turret. The rotating coupler may include a rotating lubricant inlet and a rotating cool air inlet. The rotating lubricant inlet may be fluidly coupled to a rotating lubricant passage that extends through the rotating coupler to a rotating lubricant outlet. The rotating cool air inlet may be fluidly coupled to a rotating cool air passage that extends through the rotating coupler to a rotating cool air outlet. The method may also include rotating the turret to a position where the rotating lubricant inlet is in matching registry with the stationary lubricant outlet and where the rotating cool air inlet is in matching registry with the stationary cool air outlet. The method may also include fluidly coupling the rotating lubricant outlet and the rotating cool air outlet to a nozzle directed at the work piece and machine tool.

The features, functions, and advantages discussed above may be achieved independently in various embodiments or may be combined in yet other embodiments, further details of which can be seen with reference to the following description and drawings.

BRIEF DESCRIPTION OF THE DRAWINGS

For a more complete understanding of the disclosed methods and apparatuses, reference should be made to the embodiments illustrated in greater detail in the accompanying drawings, wherein:

FIG. 3 is a partial perspective view of one nozzle configuration for use with the machine tool assembly of FIG. 1.

FIG. 4 is a partial perspective view of a nozzle for use with the machine tool assembly of FIG. 1.

FIG. 5 is a partial sectional view of a flow combiner for use in converting separate or parallel lubricant and cool air input passages into a coaxial output flow.

The drawings are not necessarily to scale and illustrate the disclosed embodiments diagrammatically and in partial views. In certain instances, this disclosure may omit details which are not necessary for an understanding of the disclosed methods and apparatuses or which render other details difficult to perceive. Further, this disclosure is not limited to the particular embodiments illustrated herein.

DETAILED DESCRIPTION OF THE PRESENTLY PREFERRED EMBODIMENTS

Figure 1:
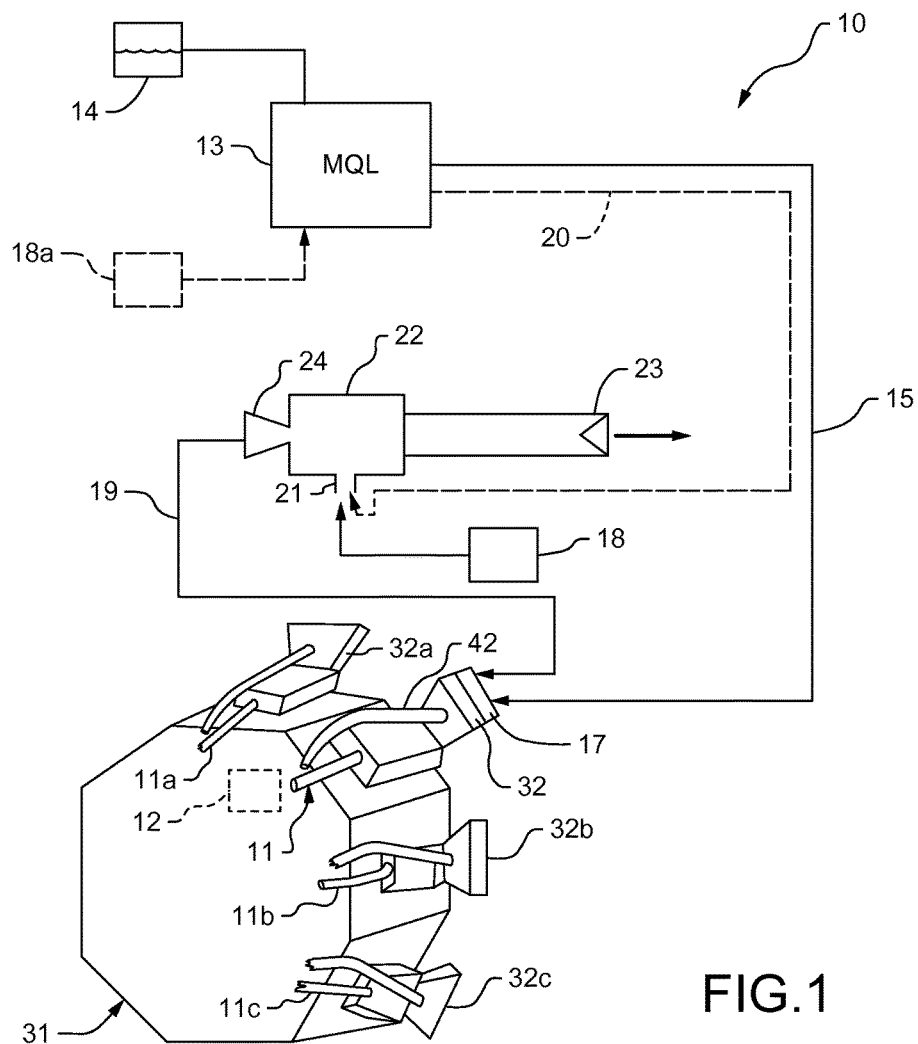
FIG. 1 schematically illustrates a disclosed machine tool assembly.
Figure 2:
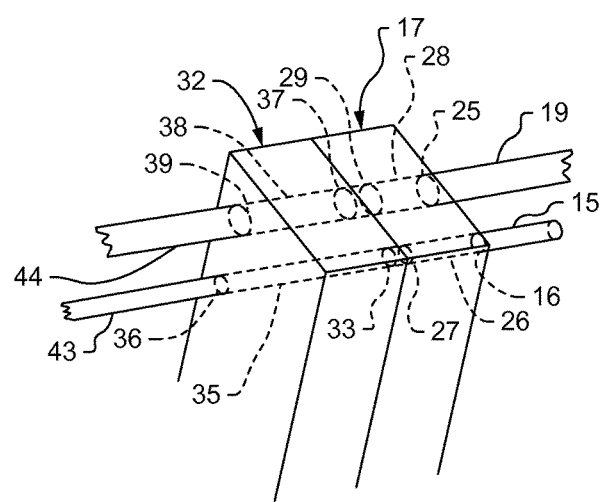
FIG. 2 is a partial perspective view of a stationary coupler and rotating coupler of the machine tool assembly of FIG. 1, with separate lubricant and cool air passages.

FIG. 1 discloses a system 10 for delivering a stream of cool air and lubricant to a machine tool 11 and a work piece 12. The system 10 may include a lubricant pump 13 that may be in the form of a minimum quantity lubricant (MQL) system, that may be powered using compressed air or shop air or that may alternatively be powered electrically or by some other means. The lubricant pump 13 may be fluidly coupled to a lubricant reservoir 14. The lubricant pump 13 may generate an output flow of lubricant through a line or conduit 15 that may be coupled to a stationary lubricant inlet 16 of a stationary coupler 17 as shown in FIG. 2. Referring back to FIG. 1, a compressed air source 18 may be fluidly coupled to a compressed air inlet 21 of a vortex tube 22. Alternatively, if a compressed air source 18a is used to power the lubricant pump 13, a compressed air output from the lubricant pump 13 may be connected to the compressed air inlet 21 via a tube or conduit 20 as shown in phantom in FIG. 1. The vortex tube 22 may include a hot air outlet 23 and a cool air outlet 24.

The cool air outlet 24 of the vortex tube 22 may be fluidly coupled to a stationary cool air inlet 25 of the stationary coupler 17 by way of the cool air conduit 19 as shown in FIGS. 1 and 2. Referring to FIG. 2, the stationary lubricant inlet 16 of the stationary coupler 17 may be fluidly coupled to a stationary lubricant passage 26 that extends through the stationary coupler 17 to a stationary lubricant outlet 27. Similarly, the stationary cool air inlet 25 may be fluidly coupled to a stationary cool air passage 28 that extends through the stationary coupler 17 to a stationary cool air outlet 29.

Figure 6:
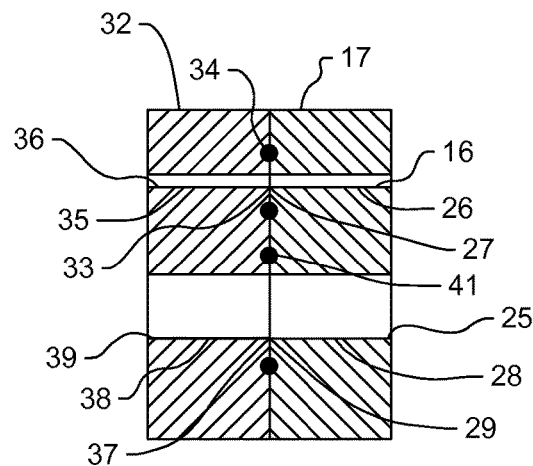
FIG. 6 is a partial sectional view of the stationary coupler and rotating coupler shown in FIG. 2.

Returning to FIG. 1, the system 10 may also include a rotating turret 31 with a plurality of machine tools 11 and 11a-11c mounted thereon. In addition to the machine tools 11 and 11a-11c shown in FIG. 1, the turret 31 is connected or coupled to a plurality of rotating couplers 32 and 32a-32c. Referring to FIG. 2, the rotating coupler 32 includes a rotating lubricant inlet 33 that receives lubricant from the stationary lubricant outlet 27 as shown in FIG. 2 when the turret 31 is rotated to the position shown in FIGS. 1 and 2 with the rotating coupler 32 in an abutting engagement with the stationary coupler 17. With the stationary coupler 17 and rotating coupler 32 in proper alignment, the rotating lubricant inlet 33 is in matching registry with the stationary lubricant outlet 27. Further, a lubricant seal 34 may be sandwiched between the stationary coupler 17 and the rotating coupler 32 as shown in FIG. 6. The rotating lubricant inlet 33 may be fluidly coupled to a rotating lubricant passage 35 that may be fluidly coupled to a rotating lubricant outlet 36. Similarly, with the stationary coupler 17 and rotating coupler 32 in the position shown in FIGS. 2 and 6, the stationary cool air outlet 79 is in matching registry with a rotating cool air inlet 37 of the rotating coupler 32, which may be fluidly coupled to a rotating cool air passage 38, which may be fluidly coupled to a rotating cool air outlet 39. Further, when the stationary coupler 17 and rotating coupler 32 are in the position shown in FIGS. 2 and 6, a cool air seal 41 may be sandwiched between the stationary coupler 17 and rotating coupler 32 as shown in FIG. 6. The lubricant seal 34 may encircle the stationary lubricant outlet 27 and the rotating lubricant inlet 33 and the cool air seal 41 may encircle the stationary cool air outlet 29 and the rotating cool air inlet 37 as shown in FIG. 6.

Returning to FIG. 1, the rotating coupler 32 may be fluidly coupled to a nozzle 42. As shown in FIGS. 2 and 3, the nozzle 42 may include a separate lubricant conduit 43 that is fluidly coupled to the rotating lubricant outlet 36 and a separate cool air conduit 44 that is fluidly coupled to the rotating cool air outlet 39. Alternatively, a nozzle 42a may be provided wherein the lubricant conduit 43a is disposed coaxially within the cool air conduit 44a as shown in FIG. 4. Further, the nozzles 42, 42a may include a mixing chamber 45, 45a and a nozzle outlet 46, 46a as shown in FIGS. 3-4 respectively.

Figure 7:
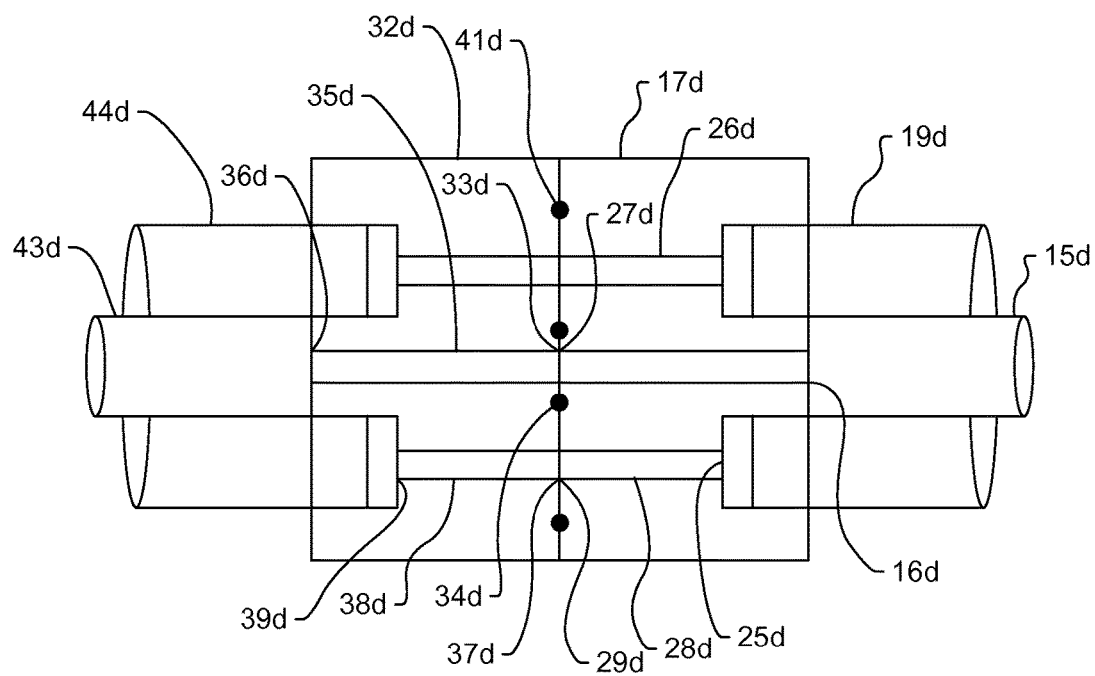
FIG. 7 is a partial sectional view of a stationary coupler and rotating coupler, wherein the lubricant and cool air streams are coaxial.

FIG. 5 illustrates a flow combiner 51 for converting separate or parallel flows of lubricant and cool air into a coaxial arrangement for input to the stationary coupler 17d that is shown in detail in FIG. 7. A separate lubricant conduit 15 and a separate cool air conduit 19 may be connected to a housing 52 that includes a lubricant conduit 54 and a cool air passage 53. Further, the lubricant conduit 54 may extend through an opening 55 in the cool air passage 53. The cool air passage 53 may be connected the stationary cool air passage 28d of the stationary coupler 17d and the lubricant conduit 54 may be connected to the stationary lubricant passage 26d of the stationary coupler 17d.

Turning to FIG. 7, the stationary coupler 17d provides a coaxial input to a rotating coupler 32d that provides a coaxial output of lubricant and cool air. Cool air flows through the cool air conduit 19d, which accommodates the lubricant conduit 15d. The cool air conduit 19d is connected to a stationary cool air inlet 25d, which may be connected to a stationary cool air passage 28d, which may be connected to a stationary cool air outlet 29d. The lubricant conduit 15d may be connected to a stationary lubricant inlet 16d that may be connected to a stationary lubricant passage 26d disposed coaxially within the stationary cool air passage 28d. The stationary lubricant passage 26d may be fluidly coupled to a stationary lubricant outlet 27d. Similar to the embodiment shown in FIG. 6, the stationary cool air outlet 29d may be fluidly coupled to a rotating cool air inlet 37d that may be fluidly coupled to a rotating cool air passage 38d that may be fluidly coupled to a rotating cool air outlet 39d. Similarly, the stationary lubricant outlet 27d may be fluidly coupled to a rotating lubricant inlet 33d, which may be fluidly coupled to a rotating lubricant passage 35d that may be fluidly coupled to a rotating lubricant outlet 36d. The rotating coupler 32d may be fluidly coupled to a cool air conduit 44d with a lubricant conduit 43d disposed coaxially within the cool air conduit 44d. A cool air seal 41d and a lubricant seal 34d may be sandwiched between the stationary coupler 17d and rotating coupler 32d as shown in FIG. 7. The cool air seal 41d may encircle the stationary cool air outlet 29d and the rotating cool air inlet 37d and the lubricant seal 34d may encircle the stationary lubricant outlet 27d and the rotating lubricant inlet 33d.

Figure 8:
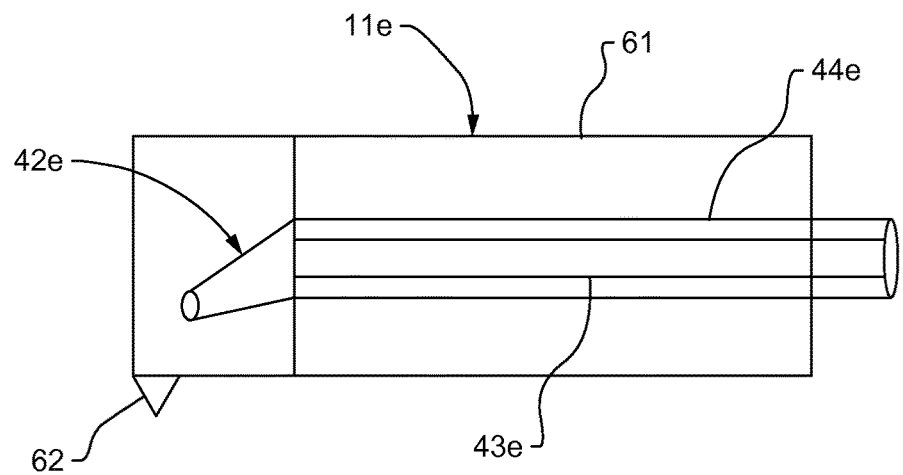
FIG. 8 is a partial sectional view of a coaxial nozzle arrangement installed within the body of machine tool.
Figure 9:
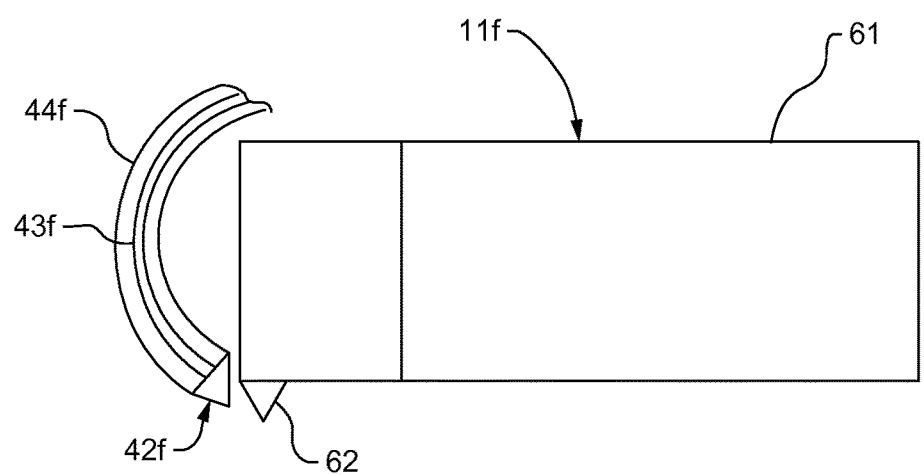
FIG. 9 is an alternative arrangement for delivering a coaxial flow of lubricant and cool air to a machine tool.

FIGS. 8-9 disclose two machine tools 11e, 11f that may be mounted to the turret 31 of FIG. 1. The machine tool 11e includes a body 61 through which a cool air conduit 44e and lubricant conduit 43e coaxially extend to a nozzle 42e disposed within the body 61. The nozzle 42e is directed at the cutting element 62. In a different arrangement, the machine tool 11f shown in FIG. 9 also includes a body 61 to which a cutting a element 62 is mounted. The lubricant conduit 43f and cool air conduit 44f extend around the body 61 before the nozzle 42f is directed at the cutting element 62.

INDUSTRIAL APPLICABILITY

A system 10 provides either coaxial or separated streams of lubricant and cool air to machine tools 11 mounted on a rotating turret 31. Cool air and lubricant is delivered to a stationary coupler 17. As the turret 31 rotates a first machine tool 11 to a position for conducting an operation on a work piece 12, the stationary coupler 17 abuttingly engages the rotating coupler 32 for the particular machine tool 11. A lubricant seal 34 and a cool air seal 41 prevent leakage of cool air or lubricant between the stationary coupler 17 and the rotating coupler 32. The output from the rotating coupler 32 may be either a coaxial arrangement of cool air surrounding an inner flow of lubricant or separated conduits 43, 44 for lubricant and cool air respectively.

In another aspect, a method for delivering lubricant entrained in the flow of cool air to a work piece 12 and a machine tool 11 includes fluidly coupling an output from lubricant pump 13 to a stationary lubricant inlet 16 of a stationary coupler 17. The stationary lubricant inlet 16 may be fluidly coupled to a stationary lubricant passage 26 that extends through the stationary coupler 17 to a stationary lubricant outlet 27. The method may further include fluidly coupling a compressed air source 18 to a compressed air inlet 21 of a vortex tube 22. The vortex tube 22 may include a cool air outlet 24 and a hot air outlet 23. The method may further include fluidly coupling the cool air outlet 24 of the vortex tube 22 to a stationary cool air inlet 25 of the stationary coupler 17. The stationary cool air inlet 25 may be fluidly coupled to a stationary cool air passage 28 that extends through the stationary coupler 17 to a stationary cool air outlet 29. The method may further include providing a rotating coupler 32 that is connected to a turret 31. The rotating coupler 32 may include a rotating lubricant inlet 33 and a rotating cool air inlet 37. The rotating lubricant inlet 33 may be fluidly coupled to a rotating lubricant passage 35 that extends through the rotating coupler 32 to a rotating lubricant outlet 36. The rotating cool air inlet 37 may be fluidly coupled to a rotating cool air passage 38 that extends through the rotating coupler 32 to a rotating cool air outlet 39. The method may further include rotating the turret 31 to a position where the rotating lubricant inlet 33 is in matching registry with the stationary lubricant outlet 27 and wherein the rotating cool air inlet 37 is in matching registry with the stationary cool air outlet 29. Finally, the method may further include fluidly coupling the rotating lubricant outlet 36 and the rotating cool air outlet 39 to a nozzle 42 that is directed at the work piece 12 and machine tool 11.

While only certain embodiments of been set forth, alternative embodiments and various modifications will be apparent from the above description to those skilled in the art. These and other alternatives are considered equivalents and within the spirit and scope of the present disclosure.

The invention claimed is:

1. A system for dispensing lubricant in a stream of cool air to a work piece and a machine tool, the system comprising:
   a lubricant reservoir fluidly coupled to a lubricant pump, the lubricant pump fluidly coupled to a stationary lubricant inlet of a stationary coupler, the stationary lubricant inlet fluidly coupled to a stationary lubricant passage that extends through the stationary coupler to a stationary lubricant outlet,
   a compressed air source fluidly coupled to a compressed air inlet of a vortex tube, the vortex tube including a cool air outlet and a hot air outlet, the cool air outlet of the vortex tube fluidly coupled to a stationary cool air inlet of the stationary coupler,
   the stationary cool air inlet fluidly coupled to a stationary cool air passage that extends through the stationary coupler to a stationary cool air outlet,
   a rotating coupler connected to a turret, the rotating coupler including a rotating lubricant inlet and a rotating cool air inlet, the rotating lubricant inlet fluidly coupled to a rotating lubricant passage that extends through the rotating coupler to a rotating lubricant outlet, the rotating cool air inlet fluidly coupled to a rotating cool air passage that extends through the rotating coupler to a rotating cool air outlet,
   the turret and rotating coupler being movable to a position where the rotating lubricant inlet is in matching registry with the stationary lubricant outlet with a lubricant seal sandwiched therebetween and where the rotating cool air inlet is in matching registry with the stationary cool air outlet with a cool air seal sandwiched therebetween,
   the rotating lubricant outlet and the rotating cool air outlet fluidly coupled to a nozzle directed at the work piece and machine tool.

2. The system of claim 1 wherein the lubricant seal is an o-ring that surrounds the stationary lubricant outlet and the rotating lubricant inlet.

3. The system of claim 1 wherein the cool air seal is an o-ring that encircles the stationary cool air outlet and the rotating cool air inlet.

4. The system of claim 1 wherein the pump is a minimum quantity lubricant (MQL) dispenser.

5. The system of claim 1 wherein the stationary coupler includes a plate-like body.

6. The system of claim 1 wherein the rotating coupler includes a plate-like body.

7. The system of claim 1 wherein the stationary coupler includes a plate-like body and the rotating coupler includes a plate-like body.

8. The system of claim 1 wherein the stationary coupler includes an inlet side and an outlet side, the stationary lubricant outlet and the stationary cool air outlet disposed on the outlet side of the stationary coupler, the outlet side of the stationary coupler being flat,
   the rotating coupler includes an inlet side and an outlet side, the rotating lubricant inlet and the rotating cool air inlet disposed on the inlet side of the stationary coupler, the inlet side of the rotating coupler being flat.

9. The system of claim 1 wherein the stationary lubricant inlet and the stationary cool air inlet are coaxial.

10. The system of claim 1 wherein the rotating lubricant outlet and the rotating cool air outlet are coaxial.

11. The system of claim 1 wherein the stationary lubricant inlet and stationary cool air inlet are not coaxial and the stationary lubricant outlet and stationary cool air outlet are coaxial.

12. The system of claim 1 further including a flow combiner disposed upstream of the stationary coupler, the flow combiner including an initial cool air inlet and an initial lubricant inlet that are not coaxial, the initial cool air inlet fluidly coupling the cool air outlet of the vortex tube to an initial cool air passage, the initial lubricant inlet fluidly coupling the pump to an initial lubricant passage, the initial lubricant passage extending into the initial cool air passage, the initial cool air passage fluidly coupling the initial cool air inlet to an initial cool air outlet, the initial lubricant passage fluidly coupling the initial lubricant passage to an initial lubricant outlet, the initial lubricant outlet coaxially disposed within the initial cool air outlet.

13. The system of claim 1 wherein the nozzle mixes lubricant from the rotating lubricant outlet with cool air from the rotating cool air outlet.

14. The system of claim 1 wherein the nozzle is mounted to a machine tool.

15. The system of claim 1 wherein the nozzle is disposed with a body of a machine tool.

16. The system of claim 1 wherein the pump is powered by compressed air.

17. A machine tool assembly, comprising:
   a minimum quantity lubricant (MQL) pump with a lubricant output and a compressed air output,
   the lubricant output fluidly coupled to a stationary lubricant inlet of a stationary coupler, the stationary lubricant inlet fluidly coupled to a stationary lubricant passage that extends through the stationary coupler to a stationary lubricant outlet,
   the compressed air output fluidly coupled to a compressed air inlet of a vortex tube, the vortex tube including a cool air outlet and a hot air outlet, the cool air outlet of the vortex tube fluidly coupled to a stationary cool air inlet of the stationary coupler,
   the stationary cool air inlet fluidly coupled to a stationary cool air passage that extends through the stationary coupler to a stationary cool air outlet,
   a rotating coupler connected to a turret, the rotating coupler including a rotating lubricant inlet and a rotating cool air inlet, the rotating lubricant inlet fluidly coupled to a rotating lubricant passage that extends through the rotating coupler to a rotating lubricant outlet, the rotating cool air inlet fluidly coupled to a rotating cool air passage that extends through the rotating coupler to a rotating cool air outlet,
   the turret and rotating coupler being movable to a position where the rotating lubricant inlet is in matching registry with the stationary lubricant outlet with a lubricant seal sandwiched therebetween and where the rotating cool air inlet is in matching registry with the stationary cool air outlet with a cool air seal sandwiched therebetween,
   the turret connected to a machine tool and a work piece,
   the rotating lubricant outlet and the rotating cool air outlet fluidly coupled to a nozzle directed at the work piece and machine tool.

18. The assembly of claim 17 wherein the turret is a vertical turret.

19. A method for delivering lubricant entrained in a flow of cool air to a work piece and a machine tool, the method comprising:
   fluidly coupling an output from a lubricant pump to a stationary lubricant inlet of a stationary coupler, the stationary lubricant inlet fluidly coupled to a stationary lubricant passage that extends through the stationary coupler to a stationary lubricant outlet, fluidly coupling a source of compressed air to a compressed air inlet of a vortex tube, the vortex tube including a cool air outlet and a hot air outlet, fluidly coupling the cool air outlet of the vortex tube to a stationary cool air inlet of the stationary coupler, the stationary cool air inlet fluidly coupled to a stationary cool air passage that extends through the stationary coupler to a stationary cool air outlet, providing a rotating coupler connected to a turret, the rotating coupler including a rotating lubricant inlet and a rotating cool air inlet, the rotating lubricant inlet fluidly coupled to a rotating lubricant passage that extends through the rotating coupler to a rotating lubricant outlet, the rotating cool air inlet fluidly coupled to a rotating cool air passage that extends through the rotating coupler to a rotating cool air outlet, rotating the turret to a position where the rotating lubricant inlet is in matching registry with the stationary lubricant outlet and where the rotating cool air inlet is in matching registry with the stationary cool air outlet, and fluidly coupling the rotating lubricant outlet and the rotating cool air outlet to a nozzle directed at the work piece and machine tool.

20. The method of claim 19 further including mixing cool air and lubricant within the nozzle.

\* \* \* \* \*